United States Patent
Zhou

(10) Patent No.: US 10,495,800 B2
(45) Date of Patent: Dec. 3, 2019

(54) 3D DISPLAY DEVICE AND 3D DISPLAY APPARATUS

(71) Applicant: BOE Technology Group Co., Ltd., Beijing (CN)

(72) Inventor: Chunmiao Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/675,133

(22) Filed: Aug. 11, 2017

(65) Prior Publication Data
US 2018/0067247 A1    Mar. 8, 2018

(30) Foreign Application Priority Data

Sep. 7, 2016 (CN) .......................... 2016 1 0807816

(51) Int. Cl.
| | |
|---|---|
| *G02B 5/30* | (2006.01) |
| *G02B 27/22* | (2018.01) |
| *G02B 27/26* | (2006.01) |
| *H04N 13/332* | (2018.01) |

(52) U.S. Cl.
CPC ........... *G02B 5/3083* (2013.01); *G02B 27/22* (2013.01); *G02B 27/26* (2013.01); *H04N 13/332* (2018.05); *H04N 2213/001* (2013.01)

(58) Field of Classification Search
CPC .................................................. G02B 5/3083
See application file for complete search history.

(56) References Cited

U.S. PATENT DOCUMENTS

| | | | | |
|---|---|---|---|---|
| 7,009,670 | B1* | 3/2006 | Huang | G02B 27/286 349/117 |
| 9,958,688 | B2 | 5/2018 | Lin et al. | |
| 2007/0139772 | A1* | 6/2007 | Wang | G02B 5/3083 359/487.03 |
| 2010/0033557 | A1* | 2/2010 | Abe | G02B 27/26 348/58 |
| 2010/0201790 | A1* | 8/2010 | Son | G02B 27/2264 348/53 |

(Continued)

FOREIGN PATENT DOCUMENTS

| | | |
|---|---|---|
| CN | 102681236 A | 9/2012 |
| CN | 102854631 A | 1/2013 |
| CN | 103698933 A | 4/2014 |

OTHER PUBLICATIONS

First Office Action, including Search Report, for Chinese Patent Application No. 201610807816.4, dated Nov. 15, 2018, 14 pages.

*Primary Examiner* — Sang V Nguyen
(74) *Attorney, Agent, or Firm* — Westman, Champlin & Koehler, P.A.

(57) ABSTRACT

The present disclosure provides a 3D display device and a 3D display apparatus. The 3D display device includes: a display panel; and a phase retarder arranged at a display side of the display panel, the phase retarder including first phase retarding bars and second phase retarding bars arranged alternately, wherein the 3D display device further includes a light shielding layer arranged at the display side of the display panel, the light shielding layer including a plurality of light shielding bars arranged to be spaced apart from each other and wherein each of the light shielding bars is arranged at an interface between adjacent first and second phase retarding bars.

12 Claims, 4 Drawing Sheets

(56) References Cited

U.S. PATENT DOCUMENTS

| | | | | |
|---|---|---|---|---|
| 2010/0289884 A1* | 11/2010 | Kang | ............. | G02B 27/2228 |
| | | | | 348/58 |
| 2011/0227886 A1* | 9/2011 | Lee | ............. | G02B 27/26 |
| | | | | 345/204 |
| 2012/0147301 A1* | 6/2012 | Jeon | ............. | G02B 27/2242 |
| | | | | 349/96 |
| 2012/0154698 A1* | 6/2012 | Matsuhiro | ............. | G02B 27/2264 |
| | | | | 349/15 |
| 2012/0162763 A1* | 6/2012 | Son | ............. | G02B 27/2214 |
| | | | | 359/463 |
| 2012/0287504 A1* | 11/2012 | Jang | ............. | G02B 27/2214 |
| | | | | 359/463 |
| 2013/0002994 A1* | 1/2013 | Wang | ............. | G02F 1/133502 |
| | | | | 349/96 |
| 2013/0100258 A1* | 4/2013 | Kim | ............. | G02B 27/26 |
| | | | | 348/51 |
| 2013/0155505 A1* | 6/2013 | Kim | ............. | G02B 27/2214 |
| | | | | 359/465 |
| 2013/0293794 A1 | 11/2013 | Hsiao et al. | | |
| 2014/0071526 A1* | 3/2014 | Ryu | ............. | G02B 27/22 |
| | | | | 359/465 |
| 2014/0133025 A1 | 5/2014 | Lee | | |
| 2015/0109666 A1* | 4/2015 | Wei | ............. | G02B 27/26 |
| | | | | 359/462 |
| 2016/0291359 A1* | 10/2016 | Jin | ............. | G02F 1/1334 |

\* cited by examiner

3D DISPLAY DEVICE AND 3D DISPLAY APPARATUS

CROSS-REFERENCE TO RELATED APPLICATION

This application claims benefit of the Chinese Patent Application No. 201610807816.4, filed with SIPO on Sep. 7, 2016, which is incorporated herein by reference in its entirety.

BACKGROUND OF THE DISCLOSURE

Field of the Disclosure

The present disclosure relates to the field of display technology, and in particular, to a 3D (three-dimensional) display device and a 3D display apparatus.

Description of the Related Art

As display technology develops continuously, 3D display has been a main trend in the display field. It may provide a vivid picture and gives an immersive feeling to users. A polarizing 3D display technology is a relatively mature display technology which decomposes an original image using a principle that a light has a "polarization orientation".

FPR (Film-type Pattern Retarder) display technology is one of the polarizing 3D display technologies. FPR display technology arranges a device (for example, a phase retarder) which may adjust the polarization orientation of an exit light in front of a display device, such that the light corresponding to the left eye pixels has a different polarization state from the light corresponding to the right eye pixels. Thus, when the light which has been transmitted through the device is observed by polarizing glasses, the left eye and the right eye may receive different signals respectively to produce three-dimensional effects because each polarizer corresponding to each eye in the polarizing glasses only permits one type of the polarized light to pass through.

SUMMARY

An embodiment of the present disclosure provides a 3D display device including: a display panel; and a phase retarder arranged at a display side of the display panel, the phase retarder including first phase retarding bars and second phase retarding bars arranged alternately, wherein the 3D display device further includes a light shielding layer arranged at the display side of the display panel, the light shielding layer including a plurality of light shielding bars spaced apart from each other and wherein each of the light shielding bars is arranged at an interface between adjacent first and second phase retarding bars.

In an embodiment, a projection of each of the light shielding bars onto the phase retarder covers at least one part of each of the adjacent first and second phase retarding bars.

In an embodiment, the light shielding layer is arranged at a side of the phase retarder close to the display panel.

In an embodiment, the light shielding layer is arranged at a side of the phase retarder away from the display panel.

In an embodiment, the light shielding layer has an aperture ratio of 92%.

In an embodiment, each of the light shielding bars has a width that is 8% of a width of a pixel of the display panel.

In an embodiment, the light shielding bars include black polymer materials or liquid crystal materials.

In an embodiment, the display panel includes a plurality of rows of left eye pixels and a plurality of rows of right eye pixels arranged alternately; each of the first phase retarding bars corresponds to one row of left eye pixels for converting a light emitted from the one row of left eye pixels into a first polarized light; each of the second phase retarding bars corresponds to one row of right eye pixels for converting a light emitted from the one row of right eye pixels into a second polarized light, wherein the first polarized light and the second polarized light have different polarization states from each other.

In an embodiment, each of the first phase retarding bars is aligned with one row of left eye pixels and each of the second phase retarding bars is aligned with one row of right eye pixels.

In an embodiment, the first polarized light is one of a left handed polarized light and a right handed polarized light and the second polarized light is the other of the left handed polarized light and the right handed polarized light.

In an embodiment, the first polarized light is a first linearly polarized light and the second polarized light is a second linearly polarized light which has a polarization orientation vertical to a polarization orientation of the first linearly polarized light.

In an embodiment, the display panel further includes a polarizer arranged at the display side of the display panel.

In an embodiment, the phase retarder and the polarizer are designed to be integrated with each other.

In an embodiment, the phase retarder is adhered to a surface of the polarizer.

In an embodiment, the display panel further includes a polarizer arranged at the display side of the display panel.

In an embodiment, the phase retarder and the polarizer are designed to be integrated with each other.

In an embodiment, the phase retarder is adhered to a surface of the polarizer.

An embodiment of the present disclosure provides a 3D display apparatus including the 3D display device according to claim 1 and a pair of polarizing 3D glasses, the pair of polarizing 3D glasses having a left lens which is transmissible for a first polarized light and a right lens which is transmissible for a second polarized light.

In an embodiment, a projection of each of the light shielding bars onto the phase retarder covers at least one part of each of the adjacent first and second phase retarding bars.

In an embodiment, the display panel includes a plurality of rows of left eye pixels and a plurality of rows of right eye pixels arranged alternately; each of the first phase retarding bars corresponds to one row of left eye pixels for converting a light emitted from the one row of left eye pixels into the first polarized light; each of the second phase retarding bars corresponds to one row of right eye pixels for converting a light emitted from the one row of right eye pixels into the second polarized light, wherein the first polarized light and the second polarized light have different polarization states from each other.

BRIEF DESCRIPTION OF THE DRAWINGS

Drawings described herein are intended to explain the selected embodiments, instead of illustrating all of embodiments, and are not intended to limit the scope of the present disclosure.

Throughout all of drawings, like reference numerals indicate like parts or features.

DETAILED DESCRIPTION OF PREFERRED EMBODIMENTS OF THE DISCLOSURE

Figure 1:
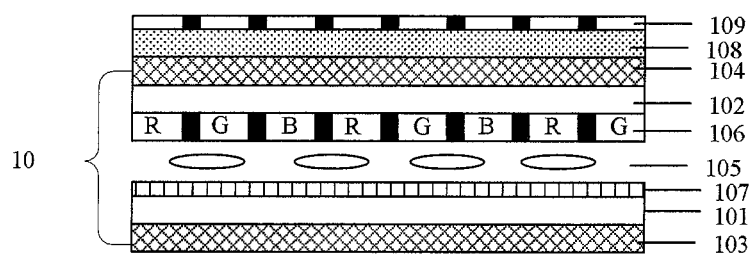
FIG. 1 is a schematic cross sectional view showing a 3D display device according to an embodiment of the present disclosure.

The exemplified embodiments of the present disclosure will below be explained more comprehensively with reference to drawings such that objects, technical solutions and advantages of the present disclosure become more explicit. Further embodiments and scope will become apparent from the description provided in the present disclosure. It should be understood that features in the respective embodiments of the present disclosure may be implemented separately or in combination with one or more other embodiments. It should also be understood that the description and specific embodiments of the present disclosure are intended to explain the present disclosure, instead of limiting the scope of the present disclosure.

In accordance with a generic technical concept of the present disclosure, an embodiment of the present disclosure provides a 3D display device including: a display panel; and a phase retarder arranged at a display side of the display panel, the phase retarder including first phase retarding bars and second phase retarding bars arranged alternately, wherein the 3D display device further includes a light shielding layer arranged at the display side of the display panel, the light shielding layer including a plurality of light shielding bars spaced apart from each other and wherein each of the light shielding bars is arranged at an interface between adjacent first and second phase retarding bars.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It should be noted that in the embodiments of the present disclosure, the term of "view angle in vertical direction" means the view angle of the user in a direction vertical to a line connecting two eyes when he observes a screen. In a desired case, within the angular range, only the light corresponding to the left eye pixels can be directed into the left eye of the user while the light corresponding to the right eye pixels cannot be directed into the left eye of the user. Correspondingly, only the light corresponding to the right eye pixels can be directed into the right eye of the user while the light corresponding to the left eye pixels cannot be directed into the right eye of the user.

FIG. 1 is a schematic cross sectional view showing a 3D display device according to an embodiment of the present disclosure. As illustrated in FIG. 1, the 3D display device includes a display panel 10, a phase retarder 108 arranged at a display side of the display panel 10 and a light shielding layer 109 arranged at a side of the phase retarder 108 away from the display panel 10.

Figure 7:
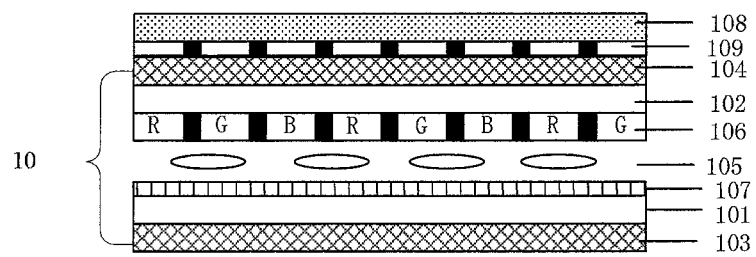
FIG. 7 is a schematic cross sectional view showing a 3D display device according to another embodiment of the present disclosure.

In an embodiment of the present disclosure, the light shielding layer 109 may also be arranged at a side of the phase retarder 108 close to the display panel 10, that is, may be arranged at an inner side of the phase retarder 108, as shown in FIG. 7.

As an example, the display panel 10 may be a liquid crystal display panel. It includes a first substrate 101 and a second substrate 102 opposed to each other; a liquid crystal layer 105 arranged between the first substrate 101 and the second substrate 102; a first polarizer 103 arranged at a side of the first substrate 101 away from the liquid crystal layer 105; a second polarizer 104 arranged at a side of the second substrate 102 away from the liquid crystal layer 105; an alignment film 107 arranged at a side of the first substrate 101 close to the liquid crystal layer and a color filter layer 106 arranged at a side of the second substrate 102 close to the liquid crystal layer 105. The color filter layer 106 may include a color filter film (R, G, B) and a black matrix (BM).

It should be noted that the structure of the display panel 10 in the embodiment is only illustrative. The scope of the present disclosure is not limited to this. As an example, other than the embodiment shown in FIG. 1, the first polarizer 103 and the second polarizer 104 may also be arranged respectively at the side of the first substrate 101 close to the liquid crystal layer and at the side of the second substrate 102 close to the liquid crystal layer. Furthermore, for example, the display panel 10 may also be an OLED display panel.

Figure 2:
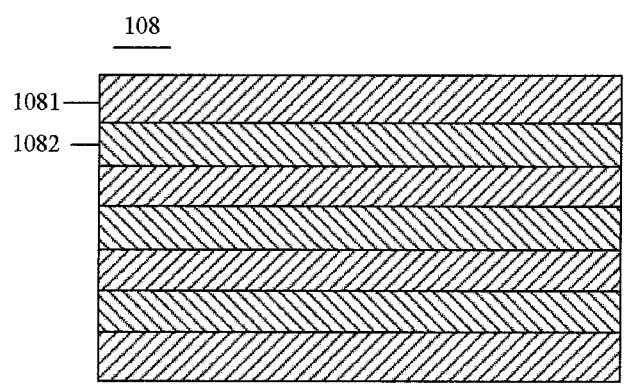
FIG. 2 is a schematic view showing a planar structure of a phase retarder.

FIG. 2 is a schematic view showing a planar structure of a phase retarder. As illustrated in FIG. 2, the phase retarder 108 includes first phase retarding bars 1081 and second phase retarding bars 1082 arranged alternately. The first phase retarding bars 1081 are configured to convert a light exiting from the display panel 10 into a first polarized light. The second phase retarding bars 1082 are configured to convert a light exiting from the display panel 10 into a second polarized light. In this example, the first polarized light has a different polarization state from the polarization state of the second polarized light. In an embodiment, the first phase retarding bars 1081 and the second phase retarding bars 1082 have an equal width and arranged in parallel to each other. However, the embodiments of the present disclosure are not limited to this. For example, the width of the first phase retarding bars 1081 may not be equal to the width of the second phase retarding bars 1082, too. As an example, the width of each of the first phase retarding bars may be arranged in a range from tens of micrometers to hundreds of micrometers. As an example, the width of each of the second phase retarding bars may be arranged in a range from tens of micrometers to hundreds of micrometers.

In an embodiment of the present disclosure, the display panel includes a plurality of rows of left eye pixels and a plurality of rows of right eye pixels. Each of the first phase retarding bars corresponds to one row of left eye pixels for converting a light emitted from the one row of left eye pixels into a first polarized light. Each of the second phase retarding bars corresponds to one row of right eye pixels for converting a light emitted from the one row of right eye pixels into a second polarized light. As an example, each of the first phase retarding bars is aligned with one row of left eye pixels and each of the second phase retarding bars is aligned with one row of right eye pixels. For example, the first polarized light may be one of a left handed polarized light and a right handed polarized light and the second polarized light is the other of the left handed polarized light and the right handed polarized light. In another example, the first polarized light may be a first linearly polarized light and the second polarized light may be a second linearly polarized light which has a polarization orientation vertical to a polarization orientation of the first linearly polarized light. For example, the first polarized light may be one of a horizontal linearly polarized light and a vertical linearly polarized light, and the second polarized light may be the other one of the horizontal linearly polarized light and the vertical linearly polarized light. It should be understood that the polarization states of the first polarized light and the second polarized light are not limited to this.

Figure 3:
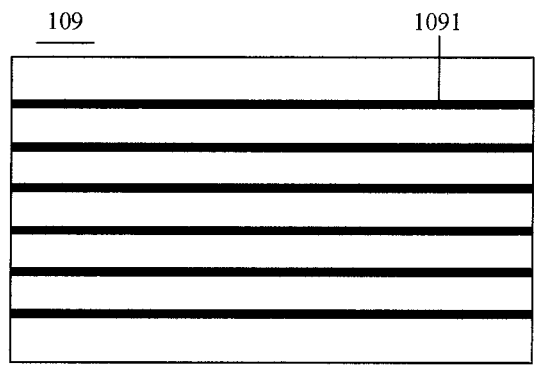
FIG. 3 is a schematic view showing a planar structure of a light shielding layer.

FIG. 3 is a schematic view showing a planar structure of a light shielding layer 109. As illustrated in FIG. 3, the light shielding layer 109 includes a plurality of light shielding bars 1091 arranged to be spaced apart from each other. Each of the light shielding bars is arranged at an interface between adjacent first and second phase retarding bars. In an embodiment, a projection of each of the light shielding bars onto the phase retarder covers at least one part of each of the adjacent first and second phase retarding bars. That is, the projection of each of the light shielding bars onto the phase retarder is overlapped at least partly with both the first phase retarding bar and the second phase retarding bar.

Figure 4A:
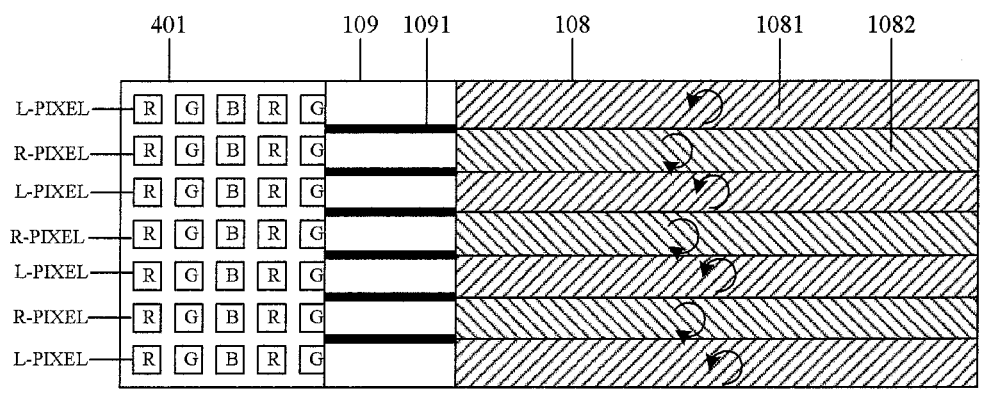
FIG. 4a is a schematic view showing an exemplified positional relation among the light shielding layer, the phase retarder and a pixel layer.
Figure 4B:
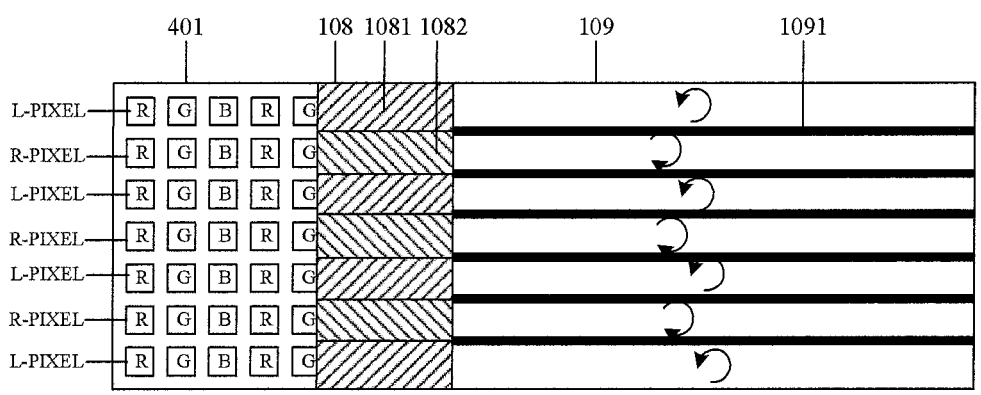
FIG. 4b is a schematic view showing another exemplified positional relation among the light shielding layer, the phase retarder and the pixel layer.

FIG. 4a is a schematic view showing an exemplified positional relation among the light shielding layer, the phase retarder and a pixel layer; and FIG. 4b is a schematic view showing another exemplified positional relation among the light shielding layer 109, the phase retarder 108 and the pixel layer 401. In FIG. 4a, the light shielding layer 109 is arranged at an inner side of the phase retarder 108. In FIG. 4b, the light shielding layer 109 is arranged at an outer side of the phase retarder 108. As shown in FIG. 4a and FIG. 4b, each of the light shielding bars 1091 of the light shielding layer 109 is arranged at the interface between the adjacent first and second phase retarding bars 1081, 1082. Each of the first phase retarding bars 1081 corresponds to one row of left eye pixels L-PIXEL. The linearly polarized light emitted from the left eye pixels L-PIXEL may for example be converted into a left handed polarized light after it passes through the first phase retarding bar 1081. Each of the second phase retarding bars 1082 corresponds to one row of right eye pixels R-PIXEL. The linearly polarized light emitted from the right eye pixels R-PIXEL may for example be converted into a right handed polarized light after it passes through the second phase retarding bar 1082.

In an embodiment of the present disclosure, the light shielding layer may only include the light shielding bars at the interfaces between the first phase retarding bars and the second phase retarding bars. That is, the light shielding bars may be directly arranged on a surface of the phase retarder. Alternatively, the light shielding layer may include a transparent substrate and light shielding bars arranged on the transparent substrate. In this circumstance, the light shielding layer may be adhered to the surface of the phase retarder.

In an embodiment, the light shielding layer may have an aperture ratio of 92%. The width of each of the light shielding bars on the light shielding layer may be arranged as 8% of a width of a pixel. By means of such configuration, the entire brightness of the 3D display device will not be degraded while the view angle in vertical direction can be increased.

In an embodiment, the light shielding bars on the light shielding layer may include or be composed of polymer materials or liquid crystal materials (for example, replaceable liquid crystal materials). The part between adjacent light shielding bars may be made from transparent materials. In particular, the light shielding bars may be produced by printing or jetting (in ink jetting mode) black ink. In order to enhance the brightness of the 3D display device in non-3D display mode, the light shielding bars may also be produced by printing or jetting (in ink jetting mode) replaceable liquid crystal materials.

Figure 5A:
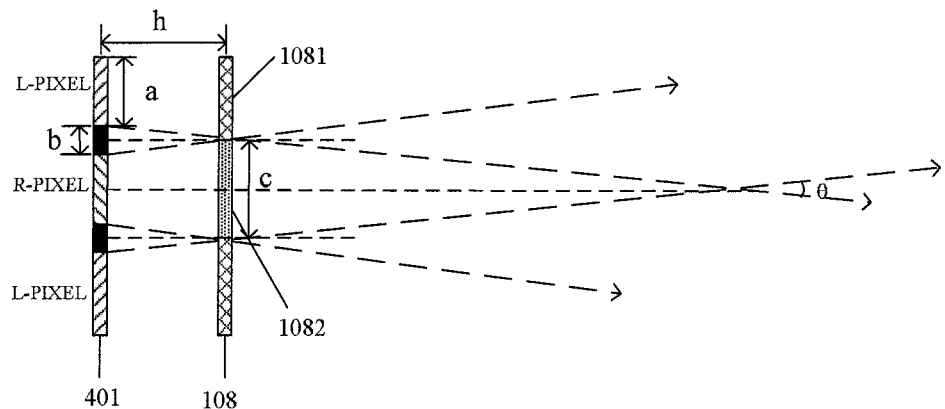
FIG. 5a is a schematic view showing a view angle in a vertical direction when the light shielding layer is not provided.
Figure 5B:
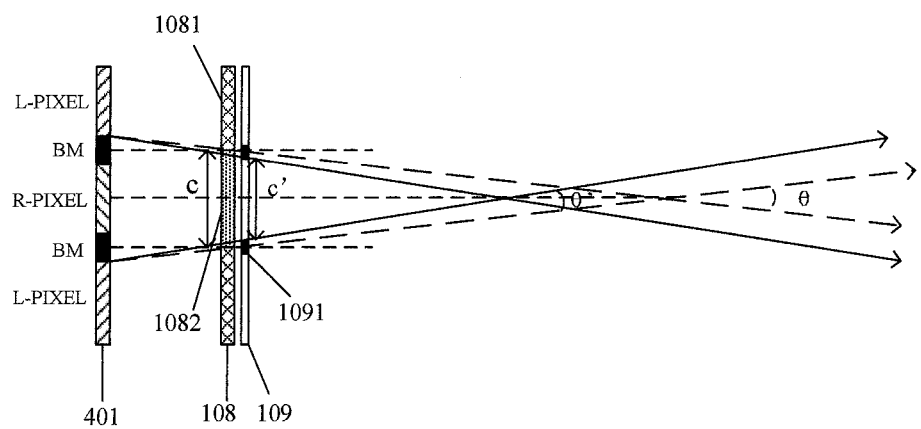
FIG. 5b is a schematic view showing a view angle in a vertical direction when the light shielding layer is provided.

FIG. 5a is a schematic view showing a view angle in a vertical direction when the light shielding layer is not provided; and FIG. 5b is a schematic view showing a view angle in a vertical direction when the light shielding layer is provided. For the sake of comparison, FIG. 5b also shows the view angle when the light shielding layer is not provided.

It should be noted that the optical paths shown in FIG. 5a and FIG. 5b only consider the disturbance of adjacent pixels to the current pixel. In the example, the view angle corresponding to the right eye pixels may be taken as an example for explanation. In particular, the view angle in vertical direction may be defined in an angular range in which the light corresponding to the right eye pixels R-PIXEL can be directed into the right eye of the user and two upper and lower rows of left eye pixels L-PIXEL adjacent to the right eye pixels R-PIXEL cannot be directed into the right eye of the user. It can be seen from the optical path shown in FIG. 5b that the light shielding bars 1091 are arranged at the interface between the first phase retarding bars 1081 and the second phase retarding bars 1082, which may enhance the view angle in the vertical direction.

As shown in FIG. 5a, without providing the light shielding layer, the view angle θ in the vertical direction may be derived by the following equation (1):

$$\tan\frac{\theta}{2} = \frac{p+b-c}{2h} \quad (1)$$

where a is the width of the left eye pixels L-PIXEL and the right eye pixels R-PIXEL in vertical direction, b is the width of the black matrix BM in vertical direction, h is a distance between the pixel layer and the phase retarder, c is the width of the first phase retarding bars and the second phase retarding bars in vertical direction, and p is a constant value and p=a+b. It can be determined from the equation (1) that if all of p, b and h are constant values, the view angle θ depends on the width c of the first phase retarding bars and the second phase retarding bars.

As shown in FIG. 5b, the light shielding layer 109 is arranged in front of the phase retarder and the light shielding bars 1091 on the light shielding layer 109 cover at least one part of the first phase retarding bars 1081 and the second phase retarding bars 1082 adjacent to each other, thus, the width of the first phase retarding bars 1081 and the second phase retarding bars 1082 is reduced from c to c'. In this circumstance, the view angle θ' in the vertical direction may be derived by the following equation (2):

$$\tan\frac{\theta'}{2} = \frac{p+b-c'}{2h} \quad (2)$$

From comparison between the equation (1) and the equation (2), it can be determined that the light shielding layer provided in front of the phase retarder may enhance the view angle in vertical direction.

Example

For a 55 inches display panel, if the aperture ratio of the light shielding layer is 92% and the thickness of the substrate is 0.2 t, the view angles in vertical direction with the light shielding layer and without the light shielding layer are given in the following table.

|  | P (mm) | view angles in vertical direction (degrees) |
| --- | --- | --- |
| without the light shielding layer | 0.315 | 22 |
| with the light shielding layer | 0.315 | 32 |

Figure 6:
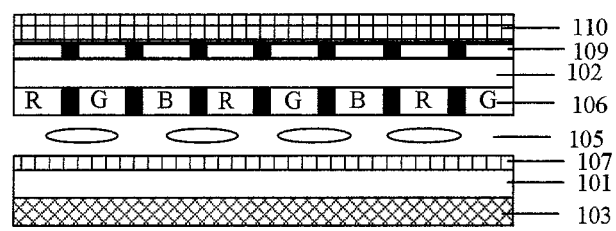
FIG. 6 is a schematic cross sectional view showing a 3D display device according to another embodiment of the present disclosure.

FIG. 6 shows a schematic cross sectional view showing a 3D display device according to another embodiment of the present disclosure. It is different from the embodiment shown in FIG. 1. In the embodiment shown in FIG. 6, the phase retarder and the polarizer are designed to be integrated with each other, to form an integral FPRPOL (Film-type Patterned Retarder Polarizer) 110. In such case, the light shielding layer 109 may be arranged at an outer side of the integral FPRPOL 110, or may arranged at an inner side of the integral FPRPOL 110. In the embodiment, by providing the light shielding film at the interface between the first phase retarding bars and the second phase retarding bars, the view angle of the 3D display device in vertical direction may be enhanced. In addition, use of the integral FPRPOL 110 may cause more compact structure of the 3D display device and reduce the light leakage.

Figure 8:
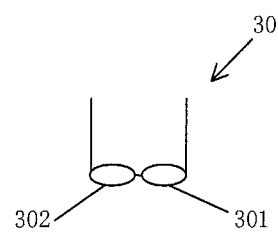
FIG. 8 is a schematic view showing a 3D display apparatus according to an embodiment of the present disclosure.
Figure 8:
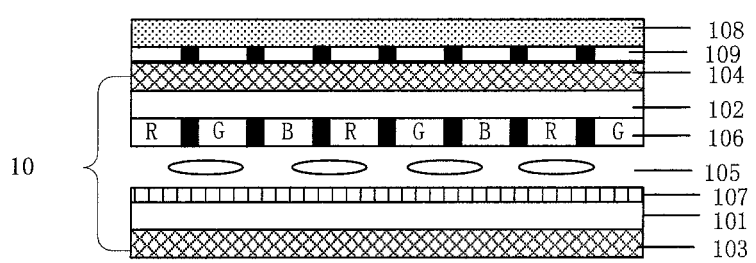

An embodiment of the present disclosure also provides a 3D display apparatus, as shown in FIG. 8. The display apparatus includes the 3D display device as described in the embodiment of the present disclosure and a pair of polarizing 3D glasses 30. The pair of polarizing 3D glasses have a left lens 301 which is transmissible for the first polarized light, for example the left handed polarized light, and a right lens 302 which is transmissible for the second polarized light, for example the right handed polarized light. The image corresponding to the left handed polarized light and the image corresponding to the right handed polarized light are directed into the left eye and the right eye of a wearer respectively, and then are combined by brain, so as to form 3D effects. The 3D display device and the 3D display apparatus according to the embodiments of the present disclosure can enhance the view angle of observation in vertical direction.

In the 3D display device and the 3D display apparatus according to the embodiments of the present disclosure, the light shielding bars on the light shielding layer are arranged at the interface between the first phase retarding bars and the second phase retarding bars, which may reduce the mutual disturbance of the light from adjacent pixels in the vertical direction, so as to increase the view angle in the vertical direction.

For purpose of describing the surface below, as the directions indicated in figures, the terms of "upper", "lower", "left", "right", "vertical", "horizontal", "inner side", "outer side" and derivatives thereof should are directed to the present disclosure. The terms of "cover", "on", "arranged on" or "arranged on top of" mean that a first element such as a first structure is provided on a second element such as a second structure. There may be an intermediate element such as an interface structure between the first element and the second element. The term of "direct contact" means that the first element such as the first structure and the second element such as the second structure are connected while there are no conductive, insulated, or semiconductor layers at the interface between the two elements.

The phrase in singular form used in the description and claims covers a plurality of the phrases, unless explained explicitly otherwise; vice versa. Thus, when the singular phrase is referred, it typically includes a plurality of the corresponding phrases. Similarly, the phrases of "comprise" and "include" will be explained to include non-exclusively. Likewise, the term of "comprise" or "or" should be explained to include, unless such explanations are forbidden explicitly herein. At the paragraphs of the description in which the term of "example" is used, in particular when it follows a group of terms, the "example" is only intended for illustration and exemplification, instead of being explained exclusively or widely.

The above embodiments are only provided for purpose of description and explanations. It is not intended to list all of embodiments exhaustively or limit the present disclosure. All of elements or features in specific embodiments are typically not limited to the specific embodiments. However, if appropriate, these elements and features are exchangeable and may be used in the selected embodiments, even if they are not depicted or described. They may also be modified by many ways. Such modifications cannot be considered to depart from the present application and all of these modifications are contained within the scope of the present disclosure.

What is claimed is:

1. A three-dimensional display device comprising:
a display panel; and
an integral Film-type Patterned Retarder Polarizer arranged at a display side of the display panel, the integral Film-type Patterned Retarder Polarizer is in a form of single layer, the integral Film-type Patterned Retarder Polarizer comprising first phase retarding bars and second phase retarding bars arranged alternately in a same layer, and the first phase retarding bars have widths different from widths of the second phase retarding bars,
wherein the three-dimensional display device further comprises a light shielding layer arranged at the display side of the display panel, the light shielding layer comprising a plurality of light shielding bars spaced apart from each other and wherein each of the light shielding bars is arranged at an interface between adjacent first and second phase retarding bars, and wherein the light shielding layer is arranged at a side of the integral Film-type Patterned Retarder Polarizer close to the display panel.

2. The three-dimensional display device according to claim 1, wherein a projection of each of the light shielding bars onto the integral Film-type Patterned Retarder Polarizer covers at least one part of each of the adjacent first and second phase retarding bars.

3. The three-dimensional display device according to claim 1, wherein the light shielding layer has an aperture ratio of 92%.

4. The three-dimensional display device according to claim 1, wherein each of the light shielding bars has a width that is 8% of a width of a pixel of the display panel.

5. The three-dimensional display device according to claim 1, wherein the light shielding bars comprise liquid crystal materials.

6. The three-dimensional display device according to claim 1, wherein the display panel comprises a plurality of rows of left eye pixels and a plurality of rows of right eye pixels arranged alternately; each of the first phase retarding bars corresponds to one row of left eye pixels for converting a light emitted from the one row of left eye pixels into a first polarized light; each of the second phase retarding bars corresponds to one row of right eye pixels for converting a light emitted from the one row of right eye pixels into a second polarized light, wherein the first polarized light and the second polarized light have different polarization states from each other.

7. The three-dimensional display device according to claim 6, wherein each of the first phase retarding bars is aligned with one row of left eye pixels and each of the second phase retarding bars is aligned with one row of right eye pixels.

8. The three-dimensional display device according to claim 6, wherein the first polarized light is one of a left handed polarized light and a right handed polarized light and the second polarized light is the other of the left handed polarized light and the right handed polarized light.

9. The three-dimensional display device according to claim 6, wherein the first polarized light is a first linearly polarized light and the second polarized light is a second linearly polarized light, and a polarization orientation of the second linearly polarized light is vertical to a polarization orientation of the first linearly polarized light.

10. A three-dimensional display apparatus comprising the three-dimensional display device according to claim 1 and a pair of polarizing three-dimensional glasses, the pair of polarizing three-dimensional glasses having a left lens which is transmissible for a first polarized light and a right lens which is transmissible for a second polarized light.

11. The three-dimensional display apparatus according to claim 10, wherein a projection of each of the light shielding bars onto the integral Film-type Patterned Retarder Polarizer covers at least one part of each of the adjacent first and second phase retarding bars.

12. The three-dimensional display apparatus according to claim 10, wherein the display panel comprises a plurality of rows of left eye pixels and a plurality of rows of right eye pixels arranged alternately; each of the first phase retarding bars corresponds to one row of left eye pixels for converting a light emitted from the one row of left eye pixels into the first polarized light; each of the second phase retarding bars corresponds to one row of right eye pixels for converting a light emitted from the one row of right eye pixels into the second polarized light, wherein the first polarized light and the second polarized light have different polarization states from each other.

* * * * *